(12) United States Patent
Jeong et al.

(10) Patent No.: US 11,222,748 B2
(45) Date of Patent: Jan. 11, 2022

(54) MULTI-LAYERED CERAMIC ELECTRONIC COMPONENT

(71) Applicant: SAMSUNG ELECTRO-MECHANICS CO., LTD., Suwon-si (KR)

(72) Inventors: Gi Seok Jeong, Suwon-si (KR); Sun Cheol Lee, Suwon-si (KR); Ho In Jun, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 16/537,841

(22) Filed: Aug. 12, 2019

(65) Prior Publication Data

US 2020/0111612 A1 Apr. 9, 2020

(30) Foreign Application Priority Data

Oct. 5, 2018 (KR) .......................... 10-2018-0119057

(51) Int. Cl.
*H01G 4/012* (2006.01)
*H01G 4/30* (2006.01)
(Continued)

(52) U.S. Cl.
CPC .......... *H01G 4/012* (2013.01); *H01G 4/1227* (2013.01); *H01G 4/248* (2013.01); *H01G 4/30* (2013.01)

(58) Field of Classification Search
CPC .......... H01G 4/012; H01G 4/30; H01G 4/248; H01G 4/1227; H01G 4/232
See application file for complete search history.

(56) References Cited

U.S. PATENT DOCUMENTS

| 6,829,135 B2 * | 12/2004 | Honda | H01G 4/232 29/25.42 |
| 7,298,604 B2 * | 11/2007 | Togashi | H01G 4/232 361/306.3 |

(Continued)

FOREIGN PATENT DOCUMENTS

| JP | 11-186092 A | 7/1999 |
| JP | 2011-18874 A | 1/2011 |

(Continued)

OTHER PUBLICATIONS

Korean Office Action dated Sep. 11, 2019 issued in Korean Patent Application No. 10-2018-0119057 (with English translation).

*Primary Examiner* — Nathan Milakovich
(74) *Attorney, Agent, or Firm* — Morgan, Lewis & Bockius LLP (57) ABSTRACT

A multilayer ceramic electronic component includes a ceramic body including a dielectric layer and a plurality of internal electrodes disposed to oppose each other with the dielectric layer interposed therebetween; and an external electrode, wherein the ceramic body comprises an active portion including a plurality of internal electrodes disposed to oppose each other with the dielectric layer interposed therebetween to form capacitance and a cover portion formed in upper and lower portions of the active portion, wherein a plurality of internal electrodes in the upper region and the lower region of the active portion is disposed inwardly of an outer side surface of the ceramic body to be spaced apart by a predetermined distance from the body portion, and the plurality of internal electrodes in the central region of the active portion and the internal electrodes having the same polarities are connected to each other via vias.

17 Claims, 5 Drawing Sheets

(51) Int. Cl.
*H01G 4/248* (2006.01)
*H01G 4/12* (2006.01)

(56) References Cited

U.S. PATENT DOCUMENTS

| | | | | |
|---|---|---|---|---|
| 9,226,401 | B2* | 12/2015 | Lee | H01G 4/008 |
| 2006/0152886 | A1* | 7/2006 | Togashi | H01G 4/30 |
| | | | | 361/306.3 |
| 2011/0007449 | A1 | 1/2011 | Seo et al. | |
| 2012/0106025 | A1* | 5/2012 | Jeong | H01G 4/30 |
| | | | | 361/301.4 |
| 2013/0250476 | A1 | 9/2013 | Chung et al. | |
| 2014/0311783 | A1 | 10/2014 | Lee et al. | |
| 2018/0027656 | A1* | 1/2018 | Jung | H05K 1/111 |
| | | | | 174/260 |
| 2019/0074137 | A1* | 3/2019 | Lee | H01G 4/30 |
| 2019/0304683 | A1* | 10/2019 | Terashita | H01G 4/12 |

FOREIGN PATENT DOCUMENTS

| | | |
|---|---|---|
| JP | 2014-220324 A | 11/2014 |
| KR | 10-2013-0107799 A | 10/2013 |
| KR | 10-2014-0124657 A | 10/2014 |
| KR | 10-2018-0004521 A | 1/2018 |

\* cited by examiner

MULTI-LAYERED CERAMIC ELECTRONIC COMPONENT

CROSS-REFERENCE TO RELATED APPLICATION(S)

This application claims benefit of priority to Korean Patent Application No. 10-2018-0119057 filed on Oct. 5, 2018 in the Korean Intellectual Property Office, the disclosure of which is incorporated herein by reference in its entirety.

BACKGROUND

1. Field

The present disclosure relates to a multi-layered ceramic electronic component, and more particularly to a multi-layered ceramic electronic component having excellent reliability.

2. Description of Related Art

In recent years, as miniaturization, slimming, and multi-functionalization of electronic products, multi-layered ceramic capacitors have been required to be miniaturized, and mounting of such multi-layered ceramic capacitors has also been highly integrated.

A multi-layered ceramic capacitor, an electronic component, may be mounted on the printed circuit boards of various types of electronic products, including image display devices, such as a liquid crystal display (LCD) and a plasma display panel (PDP), a computer, personal digital assistant (PDA), a mobile phone, and the like, serving to charge or discharge electricity.

The multi-layered ceramic capacitor may be used as a component of various electronic devices due to advantages thereof, such as miniaturization, high capacity, and ease of mounting.

Meanwhile, in recent years, as industry interest in electronic products has increased, multilayer ceramic capacitors have been required to have high capacity and high reliability characteristics to be used in automobiles and infotainment systems.

As described above, in order to realize the multi-layered ceramic capacitor satisfying high capacity and high reliability characteristics, a structure for increasing the number of laminated layers of the dielectric layer and the internal electrode layer and significantly reducing the width of the margin portion is required in proportion thereto.

However, according to the above structure, an exposed surface of the internal electrode may be increased, and thus a moisture infiltration path between the external electrode and the dielectric layer may be shortened.

Therefore, by significantly reducing the exposed area of the internal electrode, it is necessary to prevent the moisture infiltration paths as much as possible and to improve moisture resistance reliability.

SUMMARY

The present disclosure relates to a multi-layered ceramic electronic component, and more particularly, to a multi-layered ceramic electronic component having excellent reliability.

According to an aspect of the present disclosure, a multi-layered ceramic capacitor includes: a ceramic body including a dielectric layer and a plurality of internal electrodes disposed to oppose each other with the dielectric layer interposed therebetween, and having first and second surfaces opposing each other in a first direction, third and fourth surfaces connected to the first and second surfaces, and opposing each other in a second direction, and fifth and sixth surfaces connected to the first to fourth surfaces, and opposing each other in a third direction; and an external electrode disposed outside of the ceramic body to be electrically connected to the internal electrode, wherein the ceramic body comprises an active portion including a plurality of internal electrodes disposed to oppose each other with the dielectric layer interposed therebetween so as to form capacitance and a cover portion formed on upper and lower portions of the active portion, wherein the active portion is composed of a central region and upper and lower regions disposed in the upper and lower portions of the central region, wherein a plurality of internal electrodes in the central region of the active portion comprise a body portion contributing to form capacitance and a lead portion having a width narrower than the width of the body portion, one end of the lead portion being exposed to the third surface or fourth surface of the ceramic body, wherein a plurality of internal electrodes in the upper region and the lower region of the active portion are disposed inwardly of an outer side surface of the ceramic body to be spaced apart by a predetermined distance, and the plurality of internal electrodes in the central region of the active portion and the internal electrodes having the same polarities may be connected to each other via vias.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will be described in detail with reference to the accompanying drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity. Further, in the drawings, elements having the same functions within the same scope of the inventive concept will be designated by the same reference numerals.

Throughout the specification, when a component is referred to as "comprise" or "comprising," it means that it may include other components as well, rather than excluding other components, unless specifically stated otherwise.

In order to clearly illustrate the present disclosure in the drawings, portions not related to the description are omitted, and thicknesses are enlarged in order to clearly illustrate various layers and regions, and similar reference numerals are used for similar portions throughout the specification.

Hereinafter, exemplary embodiments in the present disclosure will be described in detail with reference to the accompanying drawings.

Figure 1:
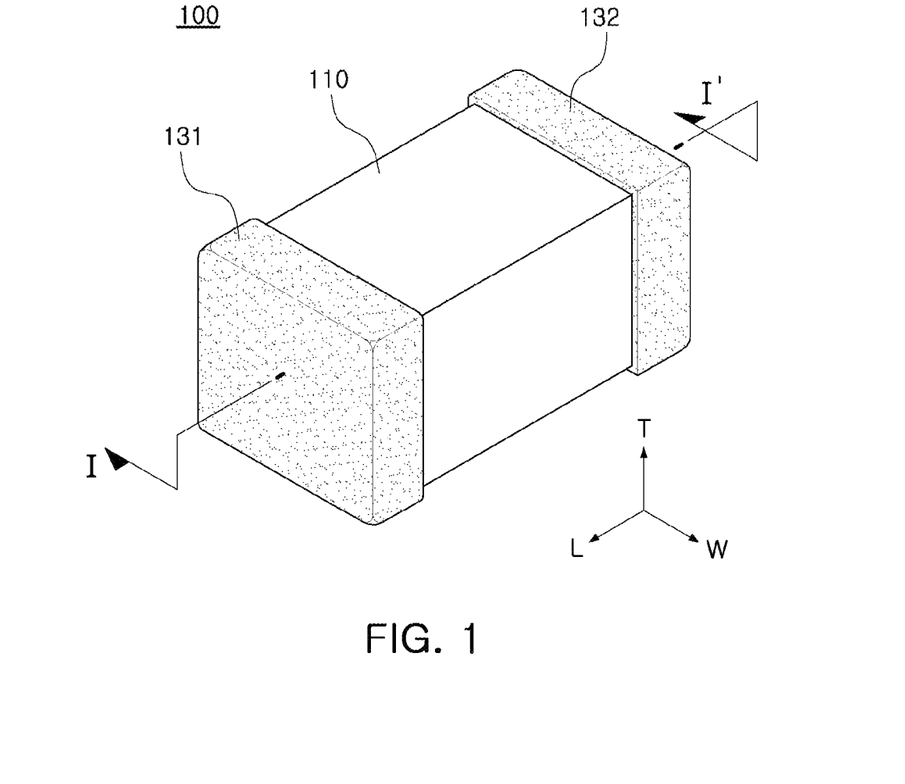
FIG. 1 is a perspective view illustrating a multi-layered ceramic capacitor according to an embodiment of the present disclosure.

FIG. 1 is a perspective view illustrating a multi-layered ceramic capacitor according to an embodiment of the present disclosure.

Figure 2:
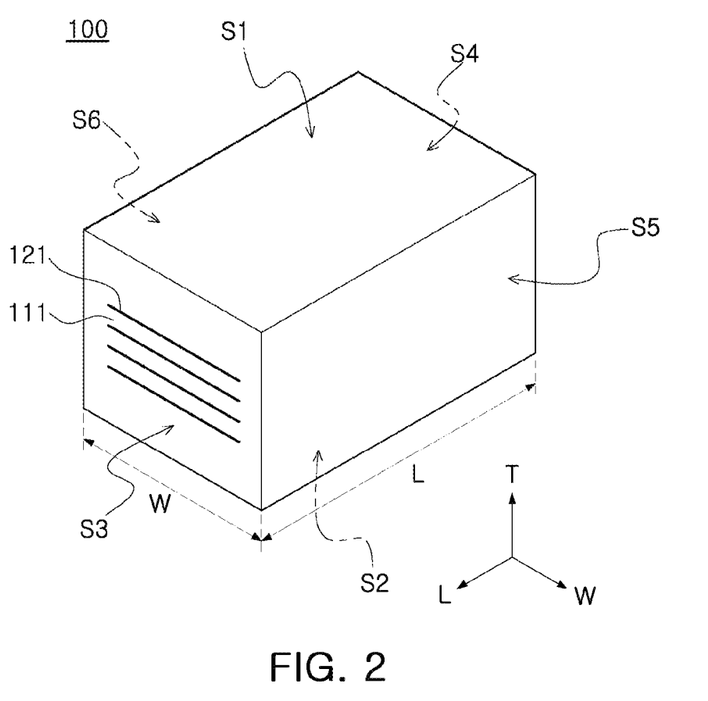
FIG. 2 is a schematic view illustrating a ceramic body according to an embodiment of the present disclosure.

FIG. 2 is a schematic view illustrating a ceramic body according to an embodiment of the present disclosure.

Figure 3:
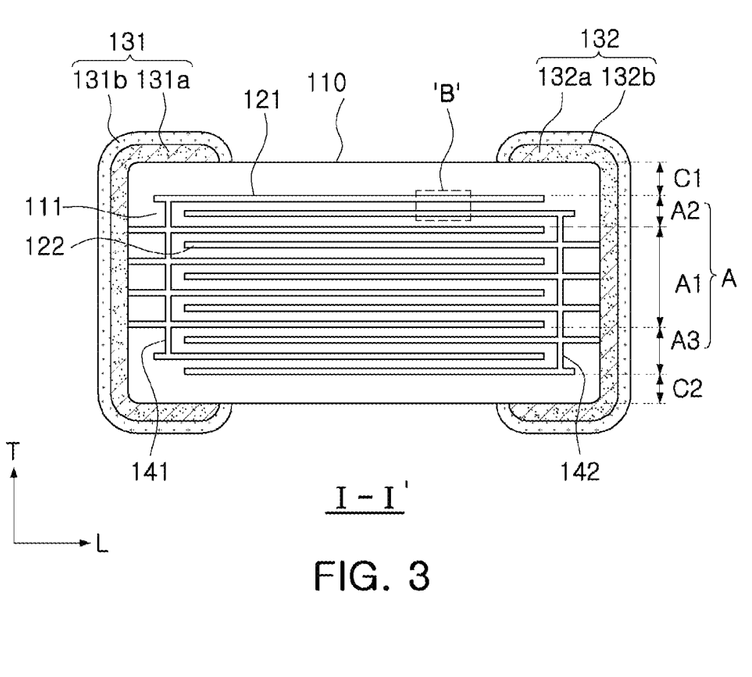
FIG. 3 is a cross-sectional view taken along line I-I' of FIG. 1.

FIG. 3 is a cross-sectional view taken along line I-I' of FIG. 1.

Referring to FIGS. 1 to 3, a multi-layered ceramic electronic component 100 according to an embodiment of the present disclosure may include a ceramic body 110 including a dielectric layer 111 and a plurality of first and second internal electrodes 121 and 122 disposed to oppose each other with the dielectric layer 111 interposed therebetween, and having a first surface S1 and a second surface S2 opposing in a first direction, a third surface S3 and a fourth surface S4 connected to the first surface S1 and the second surface S2, and opposing each other in a second direction, and a fifth surface S5 and a sixth surface S6 connected to the first to fourth surfaces S1 to S4, and opposing each other in a third direction, and first and second external electrodes 131 and 132 disposed outside of the ceramic body 110 and electrically connected to the plurality of first and second internal electrodes 121 and 122, wherein the ceramic body 110 includes an active portion A in which capacity is formed by including the plurality of first and second internal electrodes 121 and 122 disposed to opposed each other with the dielectric layer 111 interposed therebetween and upper and lower cover portions C1 and C2 formed on an upper portion and a lower portion of the active portion A, respectively.

Hereinafter, a multi-layered ceramic electronic component according to an embodiment of the present disclosure will be described, but, in particular, a multi-layered ceramic capacitor will be described, but the present disclosure is not limited thereto.

In the multi-layered ceramic capacitor according to an embodiment of the present disclosure, a 'longitudinal direction' may be defined as a 'L' direction, a 'width direction' may be defined as a 'W' direction, and a 'thickness direction' may be defined as 'T' direction. Here, the 'thickness direction' may be used in the same concept as a direction in which the dielectric layers are laminated, that is, 'a lamination direction'.

In an embodiment of the present disclosure, the ceramic body 110 is not particularly limited in shape, but may have a hexahedron shape as shown.

The ceramic body 110 may have a first surface S1 and a second surface S2 opposing in a first direction, a third surface S3 and a fourth surface S4 connected to the first surface S1 and the second surface S2, and opposing each other in a second direction, and a fifth surface S5 and a sixth surface S6 connected to the first to fourth surfaces and opposing each other in a third direction.

The first surface S1 and the second surface S2 may be defined as a surface facing each other in the thickness direction of the ceramic body 110, which is the first direction, the third surface S3 and the fourth surface S4 may be defined as a surface facing each other in the longitudinal direction, which is the second direction, and the fifth surface S5 and the sixth surface S6 may be defined as a surface facing each other in the width direction, which is the third direction.

According to an embodiment of the present disclosure, a raw material for forming the dielectric layer 111 is not particularly limited as long as sufficient electrostatic capacity may be obtained. For example, a barium titanate-based material, a lead composite perovskite-based material, a strontium titanate-based material, or the like, may be used.

As materials for forming the dielectric layer 111, a variety of ceramic additives, organic solvents, plasticizers, binders, dispersants, and the like, may be added to a powder, such as barium titanate ($BaTiO_3$), and the like, according to the present disclosure.

The ceramic body 110 may include an active portion A serving as a portion contributing to a capacity formation of the capacitor and an upper cover portion C1 and a lower cover portion C2 respectively formed in the upper and lower portions of the active portion A as upper and lower margin portions.

The active portion A may be formed by repeatedly laminating a plurality of first and second internal electrodes 121 and 122 with a dielectric layer 111 interposed therebetween.

The upper cover portion C1 and the lower cover portion C2 may have the same material and configuration as the dielectric layer 111 except that the they do not include internal electrodes.

That is, the upper cover portion C1 and the lower cover portion C2 may include a ceramic material, for example, a barium titanate ($BaTiO_3$)-based ceramic material.

The upper cover portion C1 and the lower cover portion C2 may be formed by laminating a single dielectric layer or two or more dielectric layers on the upper and lower surfaces of the active portion A in a vertical direction, respectively, and the upper cover portion C1 and the lower cover portion C2 may serve to basically prevent damages to the internal electrodes due to physical or chemical stress.

The active portion A may be composed of a central region A1 and an upper region A2 and a lower region A3 disposed in the upper portion and the lower portion of the central region A1.

Therefore, in an embodiment of the present disclosure, the ceramic body 110 may be provided with a central region A1 of the active region A disposed in the central portion thereof, an upper region A2 and a lower region A3 disposed in the upper and lower portions of the central region A1, respectively, and the upper cover portion C1 disposed in the upper portion of the upper region A2 and the lower cover portion C2 disposed in the lower portion of the lower region A3.

Figure 4A:
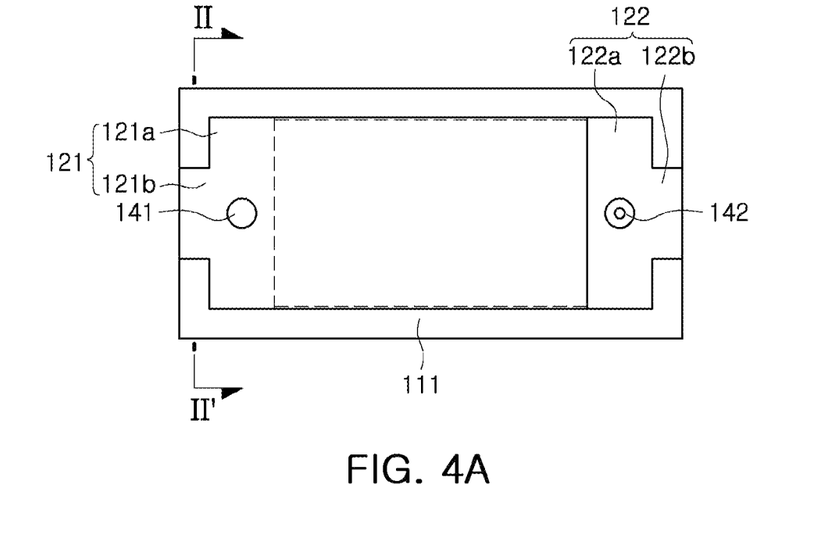
FIG. 4A is an upper plan view illustrating pattern shapes of first and second internal electrodes in a central region of an active portion in a multi-layered ceramic capacitor according to an embodiment of the present disclosure.

FIG. 4A is an upper plan view illustrating pattern shapes of the first and second internal electrodes 121 and 122 in a central region of an active portion in a multi-layered ceramic capacitor according to an embodiment of the present disclosure.

Referring to FIGS. 3 and 4A, a plurality of internal electrodes 121 and 122 in a central region A1 of the active portion A may include first and second body portions 121a and 122a contributing to capacity formation and first and second lead portions 121b and 122b having a width, smaller than widths the first and second body portions 121a and 122a, respectively, and in which one end thereof is exposed to the third surface S3 and the fourth surface S4 of the ceramic body 110, respectively.

In the plurality of the first and second internal electrodes 121 and 122 in the central region A1 of the active portion A, one end of the ceramic body 110 may be exposed to the third surface S3 or the fourth surface S4 through the lead portions 121b and 122b in which one end thereof is exposed to the third surface S3 or the fourth surface S4.

The first and second internal electrodes 121 and 122 may have a pair of first internal electrode 121 and second internal electrode 122 having different polarities.

One end of the first internal electrode 121 may be exposed to the third surface S3, and one end of the second internal electrode 122 may be exposed to the fourth surface S4.

The other end of the first internal electrode 121 may be formed at a predetermined distance from the fourth surface S4, and the other end of the second internal electrode 122 may be formed at a predetermined distance from the third surface S3. More specific details will be described later.

First and second external electrodes 131 and 132 may be formed on the third surface S3 and the fourth surface S4 of the ceramic body 110, respectively, to be electrically connected to the internal electrode.

That is, the plurality of internal electrodes may include a first internal electrode 121 and a second internal electrode 122 disposed to oppose each other with the dielectric layer 111 interposed therebetween. The first internal electrode 121 in the central region A1 of the active portion A may have the lead portion 121b exposed to the third surface S3 of the ceramic body 110, and the second internal electrode 122 in the central region A1 of the active portion A may have the lead portion 122b exposed to the fourth surface S4 of the ceramic body 110.

Recently, as industry interest in electronic products has increase, multi-layered ceramic capacitors have been required to have high capacity and high reliability characteristics to be used in automobiles or infotainment systems.

As described above, in order to realize the multi-layered ceramic capacitor satisfying the high capacity and high reliability characteristics, a structure for increasing the number of laminated layers of the dielectric layer and the internal electrode layer and significantly reducing the width of the margin portion is required in proportion thereto.

However, according to the above structure, an exposed surface of the internal electrode may be increased, and thus a moisture infiltration path may be shortened between the external electrode and the dielectric layer.

According to an embodiment of the present disclosure, the plurality of first and second internal electrodes 121 and 122 in the central region A1 of the active portion A in the ceramic body 110 may make the width of the first and second lead portions 121b and 122b smaller than that of the first and second body portions 121a and 122a, respectively, such that the exposure of the internal electrode may be significantly reduced, and the moisture resistance reliability may be improved.

Figure 5:
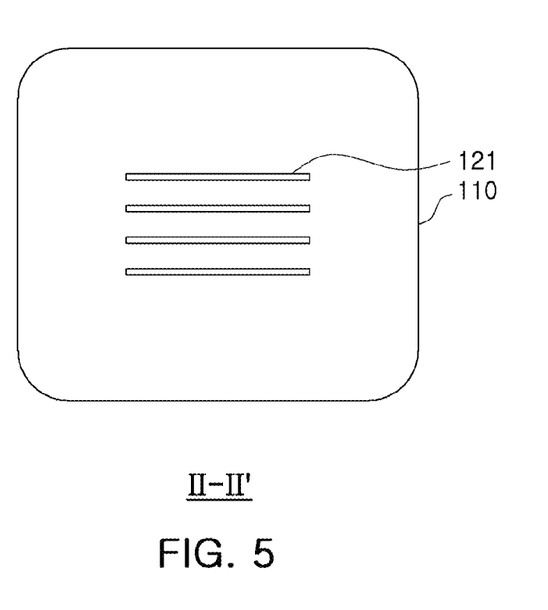
FIG. 5 is a cross-sectional view taken along line II-II' of FIG. 4A.

FIG. 5 is a cross-sectional view taken along line II-II' of FIG. 4A.

Referring to FIG. 5, it can be seen that the plurality internal electrodes in the central region of the active portion A in the ceramic body 110 make the widths of the first and second lead portions 121b and 122b smaller than those of the body portions 121a and 122a, such that the exposure of the internal electrodes may be significantly reduced.

Figure 4B:
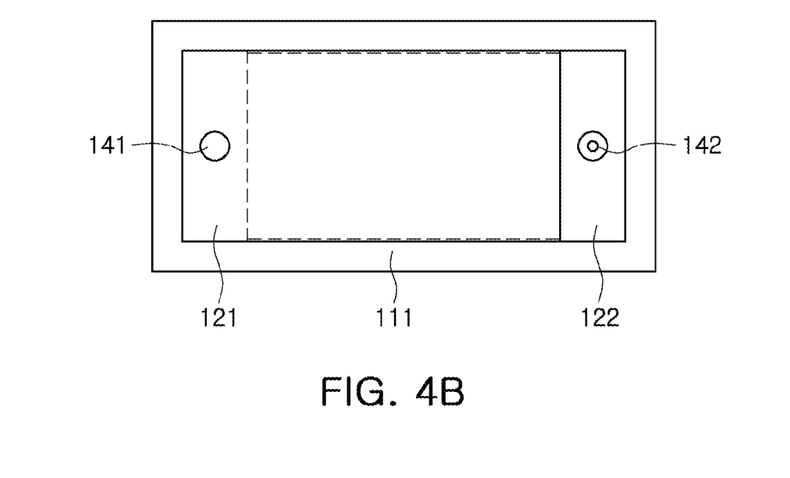
FIG. 4B is an upper plan view illustrating pattern shapes of the first and second internal electrodes in the upper and lower regions of the active portion in the multi-layered ceramic capacitor according to an embodiment of the present disclosure.

FIG. 4B is an upper plan view illustrating pattern shapes of the first and second internal shapes in the upper and lower regions of the active portion in the multi-layered ceramic capacitor according to an embodiment of the present disclosure.

Referring to FIGS. 3 and 4B, a plurality of the first and second internal electrodes 121 and 122 in the upper region A2 and the lower region A3 of the active portion A may be disposed inwardly of an outer side surface of the ceramic body 110 to be spaced apart by a predetermined distance from the body portion, and the plurality of internal electrodes 121 and 122 in the central region A1 of the active portion A and the first and second internal electrodes 121 and 122 in the upper region A2 and the lower region A3 having the same polarities may be connected to each other via first and second vias 141 and 142, respectively.

The plurality of the first and second internal electrodes 121 and 122 in the upper region A2 and the lower region A3 of the active portion A may be disposed to be spaced apart by a predetermined distance from the third surface S3 and the fourth surface S4 of the ceramic body 110.

Therefore, the plurality of internal electrodes 121 and 122 in the upper region A2 and the lower region A3 of the active portion A may not be exposed to the outside of the ceramic body 110.

The plurality of internal electrodes 121 and 122 in the upper region A2 and the lower region A3 may have a pair of the first internal electrode 121 and the second internal electrode 122 having different polarities.

Both end portions of the first internal electrode 121 and the second internal electrode 122 may be formed at regular intervals from the third surface S3 and the fourth surface S4.

Therefore, the first internal electrode 121 and the second internal electrode 122 in the upper region A2 and the lower region A3 of the active portion A may not be electrically connected to the first and second external electrodes 131 and 132 disposed on the third surface S3 and the fourth surface S4 of the ceramic body 110.

The first internal electrode 121 in the upper region A2 and the lower region A3 of the active portion A may be connected via a first via 141.

The first via 141 may be disposed in a form of penetrating the first internal electrode 121 in the central portion A1 of the active portion A in the first internal electrode 121 of the upper region A2 of the active portion A to be connected to the first internal electrode 121 in the lower region A3 of the active portion A, in order to connect the first internal electrode 121 in the upper region A2 and the lower region A3 of the active portion A.

That is, the first internal electrode 121 in the upper region A2 and the lower portion A3 of the active portion A may be connected to the first internal electrode 121 in the central region A1 of the active portion A via the first via 141.

The second internal electrode 122 in the upper region A2 and the lower region A3 of the active portion A may be connected via a second via 142.

The second via 142 may be disposed in a form of penetrating the second internal electrode 122 in the central region A1 of the active portion A in the second internal electrode 122 of the upper region A2 of the active portion A to be connected to the second internal electrode 122 in the lower region A3 of the active portion A, in order to connect the second internal electrode 122 in the upper region A2 and the lower region A3 of the active portion A.

That is, the second internal electrode 122 in the upper region A2 and the lower region A3 of the active portion A may be connected to a first internal electrode 122 in the central region A1 of the active portion A via a first via 141.

The first via 141 may be connected to the first internal electrode 121 and be insulated from the second internal electrode 122, and a second via 142 may be connected to a second internal electrode 122, and be insulated from the first internal electrode 121.

According to an embodiment of the present disclosure, the plurality of internal electrodes 121 and 122 in the central region A1 of the active portion A in the ceramic body 110 as described above may make the widths of the first and second lead portions 121b and 122b smaller than the widths of the first and second body portions 121a and 122a, respectively, such that an exposure of the internal electrodes may be significantly reduced, and moisture resistance reliability may be improved. The internal electrodes in the upper region A2 and the lower region A3 of the active portion A may not be exposed to the outside, thereby significantly reducing the exposed area of the internal electrode and improving the moisture resistance reliability.

A material forming the first and second internal electrodes 121 and 122 is not limited to any particular material. For example, a material of the first and second internal electrodes 121 and 122 may be formed using a conductive paste including one or more materials among silver (Ag), lead (Pb), platinum (Pt), nickel (Ni), and copper (Cu).

A multi-layered ceramic capacitor according to an embodiment of the present disclosure may include a first external electrode 131 electrically connected to the first internal electrode 121 and a second external electrode 132 electrically connected to the second internal electrode 122.

The first and second external electrodes 131 and 132 may be electrically connected to the first and second internal electrodes 121 and 122, respectively, to form capacitance, and the second external electrode 132 may be connected to a potential different from a potential of the first external electrode 131.

The first and second external electrodes 131 and 132 may be disposed on the third surface S3 and the fourth surface S4 of the ceramic body 110 in the longitudinal direction, which is the second direction, respectively, and may extend to and be disposed to the first surface S1 and the second surface S2 of the ceramic body 110 in the thickness direction, which is the first direction.

The first and second external electrodes 131 and 132 may be disposed outside of the ceramic body 110, and may include first and second electrode layers 131a and 132a electrically connected to the internal electrodes 121 and 122, respectively, and first and second conductive resin layers 131b and 132b disposed on the electrode layers 131a and 132a, respectively.

The first and second electrode layers 131a and 132a may include a conductive metal and a glass.

The conductive metal used in the electrode layers 131a and 132a is not particularly limited as long as it is a material that can be electrically connected to the internal electrodes for forming capacitance, for example, may be one or more materials selected from a group consisting of copper (Cu), silver (Ag), nickel (Ni), and alloys thereof.

The first and second electrode layers 131a and 132a may be formed by applying a conductive paste prepared by adding glass frit to a conductive metal powder and then sintering the paste.

The first and second conductive resin layers 131b and 132b may be formed on the electrode layers 131a and 132a, respectively, and may be formed to completely cover the electrode layers 131a and 132a, respectively.

A base resin contained in the first and second conductive resin layers 131b and 132b is not particularly limited as long as it has bondability and impact absorbing ability and may be mixed with a conductive metal powder to form a paste, for example, the base resin may include, for example, an epoxy resin.

The conductive metal powder contained in the first and second conductive resin layers 131b and 132b is not particularly limited as long as it is a material that can be electrically connected to the electrode layers 131a and 132a, for example, may include one or more materials selected from a group consisting of copper (Cu), silver (Ag), nickel (Ni), and alloys thereof.

Figure 4C:
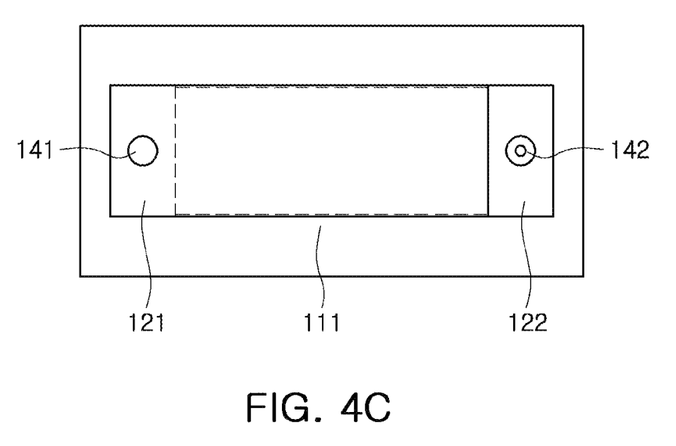
FIG. 4C is an upper plan view illustrating pattern shapes of the first and second internal electrodes in the upper and lower regions of the active portion in the multilayer ceramic capacitor according to another embodiment of the present disclosure.

FIG. 4C is an upper plan view illustrating pattern shapes of the first and second internal electrodes in the upper and lower regions of the active portion in the multi-layered ceramic capacitor according to another embodiment of the present disclosure.

According to another embodiment of the present disclosure, the widths of the plurality of internal electrodes 121 and 122 in the upper region A2 and the lower region A3 of the active portion A may be smaller than the widths of the plurality of the first and second internal electrodes 121 and 122 in the central region A1 of the active portion A.

The widths of the plurality of the first and second internal electrodes 121 and 122 in the upper region A2 and the lower region A3 of the active portion A may be adjusted to be smaller than the widths of the plurality of the first and second internal electrodes 121 and 122 in the central region A1 of the active portion A, such that it is possible to further increase the distance from an edge portion, which is vulnerable to moisture resistance of the ceramic body to the internal electrodes, thereby improving moisture resistance reliability.

Figure 6:
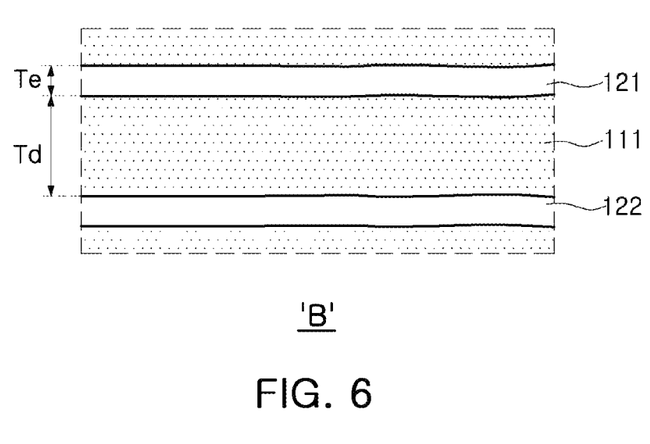
FIG. 6 is an enlarged view of region B of FIG. 3.

FIG. 6 is an enlarged view of region B of FIG. 3.

Referring to FIG. 6, in the multi-layered ceramic electronic component according to an embodiment of the present disclosure, the thickness Td of the dielectric layer 111 and the thickness Te of the first and second internal electrodes 121 and 122 may satisfy Td>2×Te.

That is, in an embodiment of the present disclosure, the thickness Td of the dielectric layer 111 may be greater than twice the thickness Te of the internal electrodes 121 and 122.

In general, high voltage electric field electronic components may have a reliability problem due to a decrease in a breakdown voltage under a high voltage environment.

A multi-layered ceramic capacitor according to an embodiment of the present disclosure may be formed by making the thickness Td of the dielectric layer 111 greater than twice the thickness Te of the first and second internal electrodes 121 and 122 in order to prevent the breakdown voltage from lowering under the high voltage environment. The breakdown voltage characteristic may be improved by increasing the thickness of the dielectric layer, which is a distance between the internal electrodes.

When the thickness Td of the dielectric layer 111 is twice or less than the thickness Te of the internal electrodes 121 and 122, the breakdown voltage may be lowered since the thickness of the dielectric layer, which is a distance between the internal electrodes, is thin.

The thickness Te of the internal electrode may be less than 1 μm, and the thickness Td of the dielectric layer may be less than 2.8 μm, but the present disclosure is not limited thereto.

Hereinafter, a method for manufacturing a multi-layered ceramic electronic component according to an embodiment of the present disclosure will be described, but the present disclosure is not limited thereto.

The method for manufacturing a multi-layered ceramic electronic component according to an embodiment of the present disclosure is as follows. A slurry formed including a powder such as barium titanate ($BaTiO_3$), or the like, may be applied to a carrier film and then dried to prepare a plurality of ceramic green sheets, thereby forming a dielectric layer.

The slurry is a slurry for a ceramic green sheet for forming a dielectric layer of the active portion of the active portion and a dielectric layer constituting the cover portion.

Next, a conductive paste for internal electrodes containing a nickel powder having an average nickel particle size of 0.1 to 0.2 μm and 40 to 50 parts by weight was provided.

The conductive paste for the internal electrodes was applied on the green sheet by a screen printing method to form the internal electrodes, and a green sheet having internal electrode patterns disposed thereon was laminated to form a ceramic body 110.

According to an embodiment of the present disclosure, the internal electrode pattern was formed such that a width of a lead portion in the central region of the active portion of the ceramic body is smaller than a width of a body portion of the internal electrode, and the lead portion is exposed to the outside of the ceramic body.

In addition, the internal electrode pattern was formed on the dielectric layer such that the internal electrode pattern is not exposed to the outside of the ceramic body in the upper portion and the lower portion of the central region of the active portion.

Next, a first via 141 and a second via 142 were formed by forming a hole in the internal electrode and filling a conductive material in the hole.

The conductive material filled to form the first via 141 and the second via 142 was applied with a conductive paste or was plated.

In this case, the holes of the ceramic body 110 was obtained by forming the ceramic green sheet by a laser technique, punching, or the like, or by performing hole processing on a laminate after sintering.

The conductive material is not particularly limited, and may include, for example, one or more conductive metal selected from a group consisting of copper (Cu), silver (Ag), nickel (Ni), and alloys thereof.

The first via 141 and the second via 142 were connected to a first internal electrode and a second electrode, respectively.

Next, an electrode layer including one or more conductive metals selected from a group consisting of copper (Cu), silver (Ag), nickel (Ni), and alloys thereof and glass was formed outside of the ceramic body.

The glass is not particularly limited, and a material having the same composition as the glass used for an external electrode of a general multi-layered ceramic capacitor may be used.

The electrode layer was formed on the upper and lower surfaces and the end portion of the ceramic body to be electrically connected to the first and second internal electrodes, respectively.

The electrode layer included 5% by volume or more of the glass compared to the volume of the conductive metal included in the electrode layer.

Next, a conductive resin composition may be applied to the first and second electrode layers 131*a* and 132*a* and then cured to form conductive resin layers 131*b* and 132*b*.

The conductive resin layers 131*b* and 132*b* included one or more conductive metals selected from a group consisting of copper (Cu), silver (Ag), nickel (Ni), and alloys thereof and an epoxy resin as a base resin.

In addition, a plating layer (not shown) was further formed in upper portions of the conductive resin layers 131*b* and 132*b*, and a nickel (Ni) plating layer and a tin (Sn) plating layer were sequentially formed and the plating layers were formed on the conductive resin layers.

As set forth above, according to an embodiment of the present disclosure, an internal electrode in a central region of the active portion in the ceramic body has a width narrower than that of the body portion to significantly reduce exposure of the internal electrode, and an internal electrode in the upper and lower regions of the active portion are not exposed to the outside, thereby significantly reducing the exposed area of the internal electrode and improving moisture resistance reliability. The internal electrodes in the upper and lower regions of the active portion are not exposed to the outside, thereby minimizing the exposed area of the internal electrodes and improving the moisture resistance reliability.

While exemplary embodiments have been shown and described above, it will be apparent to those skilled in the art that modifications and variations could be made without departing from the scope of the present invention as defined by the appended claims.

What is claimed is:

1. A multi-layered ceramic electronic component, comprising:
   a ceramic body including a dielectric layer and a plurality of internal electrodes including first and second internal electrodes disposed to oppose each other with the dielectric layer interposed therebetween, and having first and second surfaces opposing each other in a first direction, third and fourth surfaces connected to the first and second surfaces and opposing each other in a second direction, and fifth and sixth surfaces connected to the first to fourth surfaces and opposing each other in a third direction; and
   an external electrode including first and second external electrodes and disposed outside of the ceramic body, wherein
      the first external electrode covers an entire surface of a one surface of the ceramic body,
      the second external electrode covers an entire surface of an other surface opposing the one surface of the ceramic body, and
      the first and second external electrodes are electrically connected to the first and second internal electrodes, respectively,
   wherein the first internal electrode is exposed to the one surface of the ceramic body and not exposed to the other surface opposing the one surface of the ceramic body,
   wherein the second internal electrode is exposed to the other surface opposing the one surface of the ceramic body and is not exposed to the one surface of the ceramic body,
   wherein the first and second internal electrodes are exposed to the opposing surfaces alternately,
   wherein the ceramic body comprises an active portion including the plurality of internal electrodes disposed to oppose each other with the dielectric layer interposed therebetween to form capacitance and a cover portion formed in upper and lower portions of the active portion, wherein the active portion is composed of a central region and upper and lower regions disposed in upper and lower portions of the central region, wherein a plurality of internal electrodes in the central region of the active portion each comprise a body portion contributing to form capacitance and a lead portion having a width narrower than a width of the body portion, one end of the lead portion being exposed to the third surface or the fourth surface of the ceramic body, wherein a plurality of internal electrodes in the upper region and the lower region of the active portion is disposed inwardly of an outer side surface of the ceramic body to be spaced apart by a predetermined distance from the third and fourth surfaces of the ceramic body, and the plurality of internal electrodes in the central region of the active portion and the internal electrodes in the upper region and the lower region of the active portion having a same polarity are connected to each other via vias, and wherein at least two adjacent internal electrodes of the plurality of internal electrodes include an overlapping region in a stacking direction of the plurality of internal electrodes and the vias are arranged outside of the overlapping region in a direction perpendicular to the stacking direction.

2. The multi-layered ceramic electronic component of claim 1, wherein a first internal electrode in the central region of the active portion has a lead portion exposed to the third surface of the ceramic body, and a second internal electrode in the central region of the active portion has a lead portion exposed to the fourth surface of the ceramic body.

3. The multi-layered ceramic electronic component of claim 2, wherein a first internal electrode in each of the upper region and the lower region of the active portion is connected to the first internal electrode in the central region of the active portion via a first via of the vias, and a second internal electrode in each of the upper region and the lower region of the active portion is connected to the second internal electrode in the central region of the active portion via a second via of the vias.

4. The multi-layered ceramic electronic component of claim 2, wherein the external electrode includes first and second external electrodes electrically connected to the first and second internal electrodes, respectively.

5. The multi-layered ceramic electronic component of claim 4, wherein the first and second external electrodes include first and second electrode layers electrically connected to the first and second internal electrodes, respectively, and first and second conductive resin layers disposed on the electrode layers, respectively.

6. The multi-layered ceramic electronic component of claim 5, wherein the first and second conductive resin layers include an epoxy resin and a conductive metal powder.

7. The multi-layered ceramic electronic component of claim 6, wherein the conductive metal powder comprises one or more selected from a group consisting of copper (Cu), silver (Ag), nickel (Ni), and alloys thereof.

8. The multi-layered ceramic electronic component of claim 5, wherein the first and second electrode layers include: one or more conductive metals selected from a group consisting of copper (Cu), silver (Ag), nickel (Ni), and alloys thereof; and glass.

9. The multi-layered ceramic electronic component of claim 5, further comprising a plating layer respectively disposed on the first and second conductive resin layers.

10. The multi-layered ceramic electronic component of claim 9, wherein the plating layer comprises a nickel (Ni) plating layer and a tin (Sn) plating layer.

11. The multi-layered ceramic electronic component of claim 1, wherein widths of the plurality of internal electrodes in the upper region and the lower region of the active portion are smaller than the widths of the body portion of the plurality of internal electrodes in the central region of the active portion.

12. The multi-layered ceramic electronic component of claim 1, wherein a thickness (Te) of the first and second internal electrodes is less than 1 μm.

13. The multi-layered ceramic electronic component of claim 1, wherein a thickness (Td) of the dielectric layer is less than 2.8 μm.

14. The multi-layered ceramic electronic component of claim 1, wherein a thickness (Td) of the dielectric layer and a thickness (Te) of the first and second internal electrodes satisfy Td>2×Te.

15. The multi-layered ceramic electronic component of claim 1, wherein the vias are filled with a conductive material.

16. The multi-layered ceramic electronic component of claim 15, wherein the conductive material comprises one or more selected from a group consisting of copper (Cu), silver (Ag), nickel (Ni), and alloys thereof.

17. The multi-layered ceramic electronic component of claim 1, wherein the first and second internal electrodes comprise one or more selected from a group consisting of silver (Ag), lead (Pb), platinum, (Pt), nickel (Ni) and copper (Cu).

* * * * *